Jan. 24, 1950     C. K. MOUSEL     2,495,537
AIR COOLING DEVICE
Filed Nov. 15, 1946     2 Sheets-Sheet 1
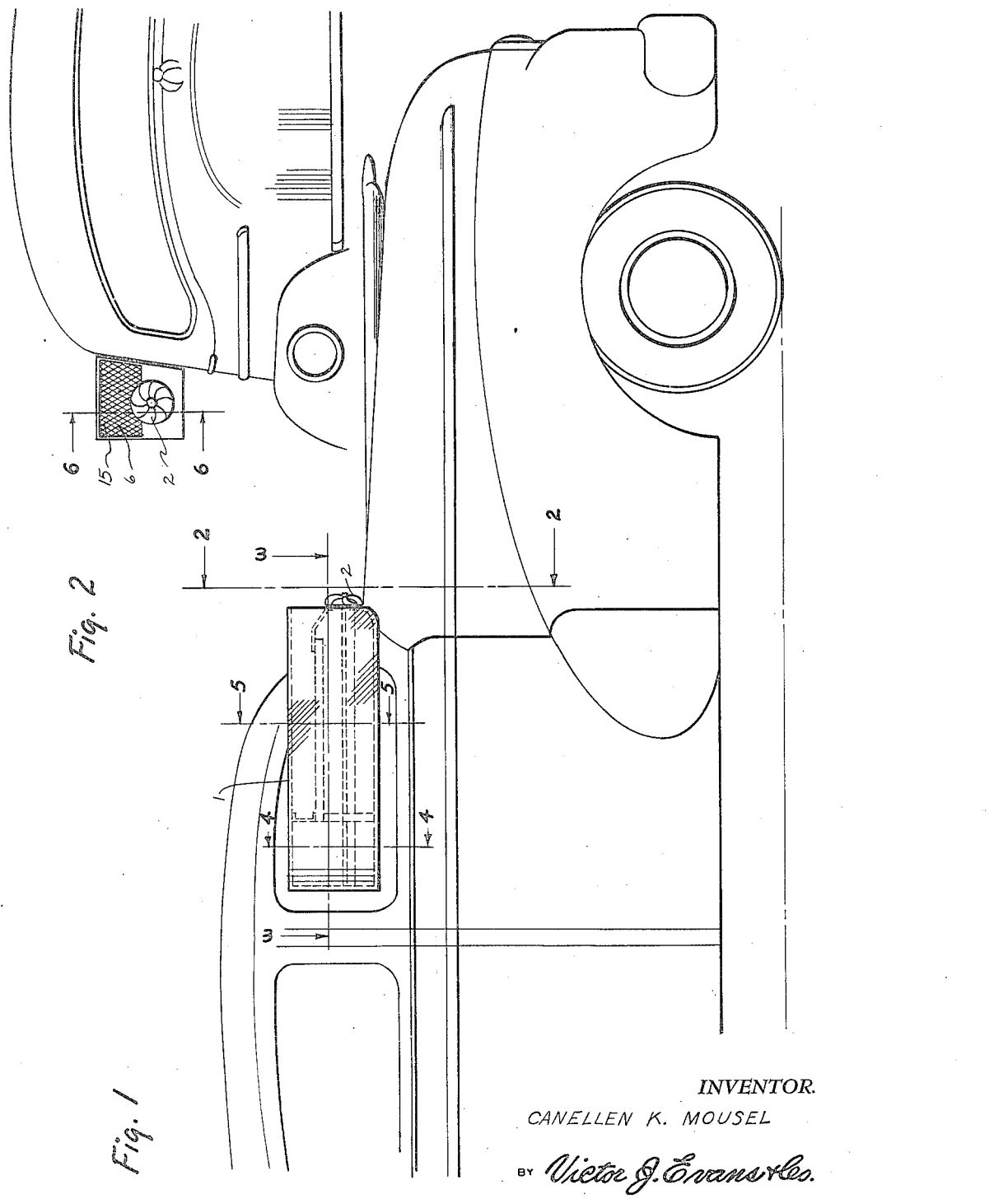
INVENTOR.
CANELLEN K. MOUSEL
BY *Victor J. Evans & Co.*
ATTORNEYS Jan. 24, 1950  C. K. MOUSEL  2,495,537
AIR COOLING DEVICE
Filed Nov. 15, 1946  2 Sheets-Sheet 2
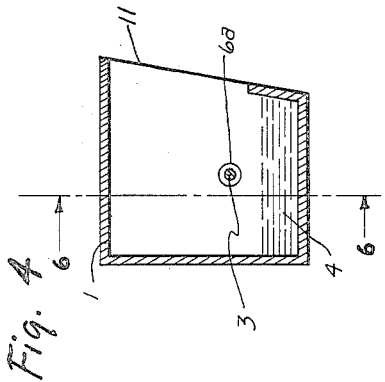
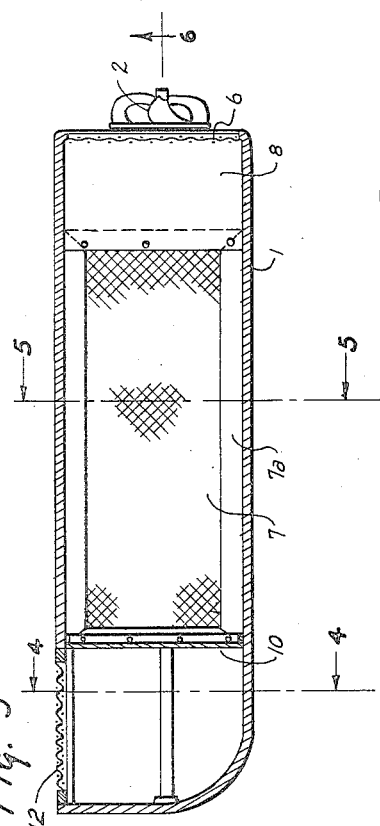
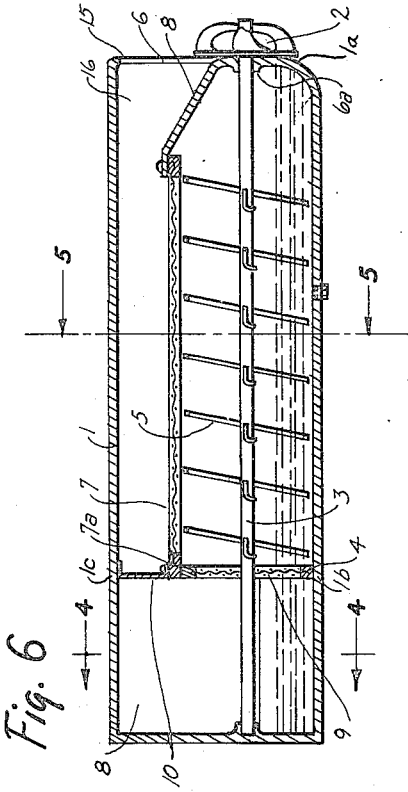
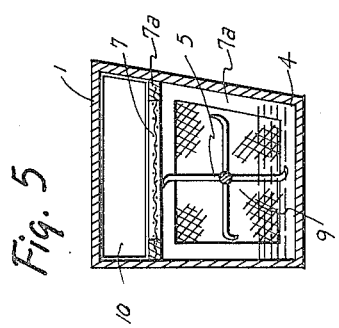
INVENTOR.
CANELLEN K. MOUSEL
BY *Victor J. Evans & Co.*
ATTORNEYS Patented Jan. 24, 1950

2,495,537

UNITED STATES PATENT OFFICE 2,495,537

AIR COOLING DEVICE

Canellen K. Mousel, Edison, Nebr.

Application November 15, 1946, Serial No. 709,917

1 Claim. (Cl. 261—92)

This invention relates to air cooling devices, and more particularly to the provision of a device for cooling the interior of moving vehicles, such as automobiles and the like.

It is an object to provide a simple cooling device which can be attached to a moving vehicle, the device tending to clean and cool the air, and requires no motive power except that created by the wind due to the moving vehicle.

A further object is to provide a casing holding a quantity of water and a wind driven propeller for rotating paddles in the water and directing the water against screens, where the water is vaporized and cooled.

These and other objects are attained by the novel construction and arrangement of parts hereinafter described and illustrated by the accompanying drawings, forming a part hereof, and in which:

Fig. 1 is a view showing the air cooler mounted on an automobile.

Fig. 2 is a view taken on the line 2—2 of Fig. 1.

Fig. 3 is a view taken on the line 3—3 of Fig. 1.

Fig. 4 is a view taken on the line 4—4 of Fig. 1.

Fig. 5 is a view taken on the line 5—5 of Fig. 1.

Fig. 6 is a view taken on the line 6—6 of Fig. 2.

Referring to the drawings, the air cooler is shown to comprise a casing 1, which is attached to the door of an automobile or the like, the window of the vehicle being open. While shown on the door, the device can obviously be mounted at other places on a vehicle.

The upper portion of the forward end of the casing is open, as at 15, and the opening 15 is covered by a screen 6. On the forward end of the casing and outside thereof is mounted a wind driven propeller 2, fixed to a shaft 3, which extends longitudinally of the casing, and which is journaled in bearings 6ª on the casing. Attached to shaft 3 are a plurality of paddles 5, which dip into a quantity of water 4 in the casing, the paddles 5 picking up the water and mixing it with the incoming air.

A screen 7, mounted in a suitable frame 7ª, is arranged horizontally within the casing 1 immediately above the paddles 5. It extends from the upper end of an inclined deflector 8 to a point short of the rear end of the casing. The deflector 8, which occupies an upwardly and rearwardly inclined position with relation to the air-intake opening 6 of the casing, extends upwardly and rearwardly from the upper edge of the front wall 1ª of the casing. A screen 9 extends from the bottom wall 1ᵇ of the casing 1 to the rear end of the screen 7, and a baffle 10 extends from the rear end of the screen 7 to the top wall 1ᶜ of the casing.

The casing is provided in its inner side wall 1ᵇ at its rear end with an outlet opening 11 through which the air is discharged directly into the automobile. This opening is also provided with a screen 12.

The air entering the air-inlet opening 15 of the casing 1, is directed across the upper side of the screen 7 by the deflector 8. Due to the baffle 10, the air is caused to flow downwardly through the screen 7, and then rearwardly through the screen 9 to and through the screen 12 into the automobile. During its passage through the device the air is laden with moisture, and the moisture laden air is directed into the automobile. Excess moisture from the air is removed by the screens 9 and 12.

The device is simple and effective, requiring practically no attention, when not in use the cooler can be easily detached and carried in the trunk of an automobile. The device obviously can be effectively and economically used for the cooling of railway cars, buses, and other public vehicles.

The above description is to be considered as illustrative and not limitative of the invention of which modifications can be made without departing from the spirit and scope of the appended claim.

The invention having been described, what is claimed is:

In an air cooling device, a casing adapted to contain water and provided at one end with an air-inlet opening and in a side thereof near its opposite end with an air-outlet opening, a wind propeller mounted outside the casing, at the front end thereof below the air inlet opening a shaft journaled in the casing and fixed to the wind propeller, and a plurality of paddles fixed to the shaft and adapted to dip into a quantity of water in the casing a screen arranged horizontally within the casing immediately above the paddles, an imperforate deflector extending upwardly from the lower wall of the air inlet opening to the screen, an imperforate baffle extending upwardly from the screen to the top of the casing, a second screen extending from the bottom of the casing to said first screen, and said deflector and baffle being adapted to cause the air to enter the casing above said first screen and flow downwardly through said screen and then through said second screen and then through the outlet opening.

CANELLEN K. MOUSEL.

REFERENCES CITED

The following references are of record in the file of this patent:

UNITED STATES PATENTS

| Number | Name | Date |
|---|---|---|
| 69,357 | Moore | Oct. 1, 1867 |
| 1,578,611 | Sanborn | Mar. 30, 1926 |
| 1,806,021 | Perkins | May 19, 1931 |
| 2,124,137 | Christian | July 19, 1938 |
| 2,230,020 | Webster | Jan. 28, 1941 |